US011651029B2

(12) United States Patent
Elder et al.

(10) Patent No.: US 11,651,029 B2
(45) Date of Patent: May 16, 2023

(54) CONTEXTUAL AUGMENTATION OF MAP INFORMATION USING OVERLAYS

(71) Applicant: Palantir Technologies Inc., Denver, CO (US)

(72) Inventors: Andrew Elder, Greenwood Village, CO (US); John Carrino, Redwood City, CA (US); Lucas Nunno, Albuquerque, NM (US); Westin Miller, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/131,374

(22) Filed: Dec. 22, 2020

(65) Prior Publication Data

US 2021/0217209 A1 Jul. 15, 2021

Related U.S. Application Data

(60) Provisional application No. 62/959,131, filed on Jan. 9, 2020.

(51) Int. Cl.
*G06T 11/00* (2006.01)
*G01C 21/20* (2006.01)

(52) U.S. Cl.
CPC .............. *G06T 11/00* (2013.01); *G01C 21/20* (2013.01)

(58) Field of Classification Search
None
See application file for complete search history.

(56) References Cited

U.S. PATENT DOCUMENTS

| | | | |
|---|---|---|---|
| 8,917,908 B2 | 12/2014 | Roberts et al. | |
| 2010/0194782 A1* | 8/2010 | Gyorfi | H04W 4/022 |
| | | | 455/456.3 |
| 2016/0284125 A1* | 9/2016 | Bostick | G06F 3/012 |
| 2016/0358471 A1* | 12/2016 | Hajj | G01C 21/3667 |
| 2019/0139317 A1 | 5/2019 | Bilbrey et al. | |
| 2019/0215660 A1* | 7/2019 | Slushtz | G01S 19/393 |
| 2019/0311513 A1 | 10/2019 | Han et al. | |
| 2020/0302510 A1* | 9/2020 | Chachek | G06K 9/6289 |

OTHER PUBLICATIONS

Extended European Search Report for EP Application No. 21150335.4 dated May 26, 2021, 8 pages.

\* cited by examiner

*Primary Examiner* — Jeffrey J Chow
(74) *Attorney, Agent, or Firm* — Sheppard Mullin Richter & Hampton LLP

(57) ABSTRACT

Systems, methods, and non-transitory computer readable media are provided for displaying and annotating map-based geolocation data at an augmented reality (AR) headset. Users with access to the map-based geolocation data can create or confirm annotations for geospatial data that may be sent to the server computer and transmitted back to the headset of the user as well as different AR headsets associated with other users.

18 Claims, 7 Drawing Sheets

CONTEXTUAL AUGMENTATION OF MAP INFORMATION USING OVERLAYS

CROSS-REFERENCE TO RELATED APPLICATIONS

This application claims the benefit of U.S. Provisional Application No. 62/959,131, filed on Jan. 9, 2020 and entitled "SYSTEMS AND METHODS FOR LOCATION-BASED INFORMATION PROCESSING WITH AUGMENTED REALITY (AR) SYSTEM", which is incorporated herein by reference in its entirety.

FIELD OF THE INVENTION

This disclosure relates to approaches for displaying map-based location data to an augmented reality (AR) headset.

BACKGROUND

Conventionally, users can view a map of a geographical area on their devices. Further, the map generally depicts information with regards to various locations within the geographical area. However, often times, the content included in the map cannot easily be changed, annotated, or edited by users that are viewing the map. As a result, users are unable to share their changes, annotations, or edits with other users in an efficient manner. Also, often times, the content included in the map relates only to brick-and-mortar locations. Therefore, the data included in conventional maps is limited to only brick-and-mortar locations.

SUMMARY

Various embodiments of the present disclosure may include systems, methods, and non-transitory computer readable media configured to display and annotate map-based geolocation data at an augmented reality (AR) headset. For example, a method may comprise determining, by a computing system, a geolocation of an augmented reality (AR) system. A plurality of annotations associated with the geolocation of the AR system may be determined by the computing system. The plurality of annotations associated with the geolocation to the AR system may be provided by the computing system. In some examples, the AR system is enabled to project the plurality of annotations to correspond with a region corresponding to the geolocation of the AR system. Information may be determined by the computing system. The information may be associated with at least one annotation of the plurality of annotations as provided by the AR system and may be based on an observation of the at least one annotation.

In some embodiments, an annotation of the plurality of annotations may be created or updated by a user of a different AR system while at the geolocation of AR system.

In some embodiments, the annotation may correspond with a route path that may include marked or unmarked terrain.

In some embodiments, the plurality of annotations may identify one or more hazards present within a region corresponding with the geolocation of the AR system.

In some embodiments, the observation of the annotation associated with the geolocation may be determined based on information provided by a user of the AR system.

In some embodiments, the process may further comprise updating information associated with the at least one annotation based on information provided by the AR system. The updating may be performed by the computing system and/or received by the AR system.

In some embodiments, the plurality of annotations are selected from a list comprising at least a route path, a person, a building, and/or a hazard.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
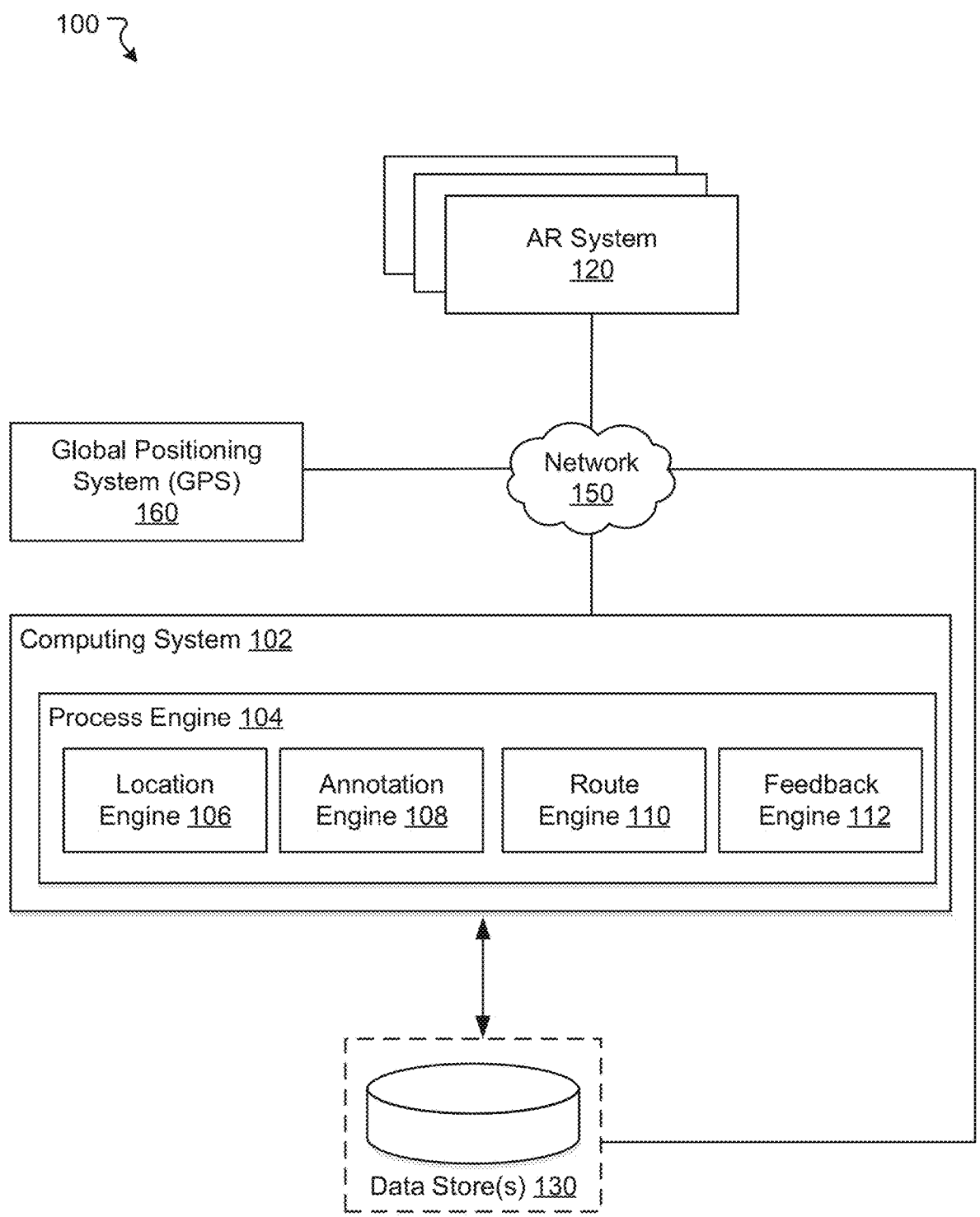
FIG. 1 illustrates an example environment for displaying and annotating map-based geolocation data at an augmented reality (AR) headset, in accordance with various embodiments.

A claimed solution rooted in computer technology overcomes problems specifically arising in the realm of computer technology. In various embodiments, map-based geolocation data for displaying by an augmented reality (AR) system are received at a server computer. Users with access to the map-based geolocation data can create or confirm annotations associated with geospatial data that may be sent to the server computer and transmitted to an AR headset (or an AR-capable device) associated with the AR system. The AR headset can be configured to display annotations that correspond to a geolocation associated with the AR headset. In various embodiments, when displaying the annotations, visual data captured by the AR headset can be augmented with data describing the annotations. In some embodiments, the augmentation of the visual data includes displaying respective graphical overlays associated with the annotations at their pre-determined geolocations within the visual data. In some embodiments, such graphical overlays can be selected by a user of the AR headset to access other related information. Many variations are possible.

Systems and methods described herein may enable dynamic updates for the AR headset for collaborative and seamless integration of geographical data and corresponding with created or confirmed annotations across a plurality of AR headsets. Some embodiments of the systems and methods described herein may comprise (1) determination of a route path along an unmapped or unmarked terrain or (2) dynamically updating annotations based on confirmations from the user of the AR headset at the geolocation of the updated annotation.

In some embodiments, the AR headset may be associated with a geolocation within a geographical area that includes unmapped terrain (e.g., limited roads, unlabeled paths, etc.). A server computer may receive geospatial data associated with the geographical area which may include, for example, elevations, unlabeled or labeled paths, and/or uneven terrain. The server computer may determine a plurality of route options in the unmapped terrain with respect to the geographical area, that begins with the geolocation of the AR headset, and remove route options that include restrictions due to the uneven terrain or other conditional factors identified in the geospatial data. The one or more remaining route options may be transmitted to the AR headset and provided as annotation(s) that overlay on the physical geographical area surrounding the AR headset. In some examples, the determined route may be displayed as an annotation pinned to the physical geographical area to identify the determined route(s).

In some embodiments, the annotations may be created or confirmed based on user feedback from the AR headset. For example, a server computer may receive one or more images of the geographical area surrounding the AR headset and associate annotations with artifacts in the images, including known images of buildings (e.g., from a third party data source), people (e.g., using a machine learning (ML) model or other image recognition algorithm), and the like. The initial set of annotations may be transmitted to the AR headset. The AR headset may physically visit the geolocation associated with the annotation of the artifact and transmit a confirmation based on a visual confirmation from the user (e.g., using a device or sensor associated with the AR headset, or using the ML model or other image recognition algorithm used to determine the initial set of annotations). When received by the server, the server may update the annotations and transmit updated annotations to a plurality of AR headsets as an overlay of the visible geolocation landscape adjacent to the AR headset. The annotations may continuously be updated and transmitted once a new annotation is received for the area adjacent to the AR headset.

In some examples, annotations can include additions to the physical geographical area, including a route on an unmapped terrain or an annotation of a point of interest associated with the physical location identified in the geographical area from feedback associated with the AR headset (e.g., labeling a building or person that is not previously labeled, etc.). In some examples, the annotation may include a hazard that may not be identified in standard geospatial data of the geolocation.

While the disclosure is described herein with respect to depictions of buildings and route paths within images, this is merely for illustrative purposes and is not meant to be limiting. The techniques described herein may apply to labeling and/or identification of other objects depicted within images, including people and hazards.

FIG. 1 illustrates an example environment for displaying and annotating map-based geolocation data at an augmented reality (AR) headset, in accordance with various embodiments. Example environment 100 may include computing system 102 in communication with AR system 120, data store 130, and global positioning system (GPS) 160 via network 150. Electronic communications may be transmitted between computing system 102, AR system 120, data store 130, and GPS 160 via network 150.

AR system 120 may include one or more processors, memory, as well as various sensors to capture sensor data, including one or more capacitive sensors capable of sensing whether an AR headset corresponding with AR system 120 is in contact with human skin or other material, stabilization sensors, motion sensors, short wave infrared (SWIR) image sensors or other infrared sensors, optical sensors, audio sensors, facial actuation sensor to detect eye movement, mosaic sensors, bio-print sensors, ultraviolet (UV) sensor, MEMS gyroscopic sensors, angular velocity sensors, piezoelectric sensors, electro-optic sensors, medical sensors, velocity sensors, force sensors, pressure sensors, proximity sensor, RFID, and the like. In various embodiments, the AR system 120 can be associated with (or implemented with) one or more AR headsets or other devices (e.g., user devices, mobile devices, etc.). For example, an AR headset may include a camera or other image capture device and can transmit an image received from the camera (e.g., using an antenna of the AR headset) to AR system 120 for internal processing or storage, or to computing system 102 for processing via network 150.

Other features may be incorporated with AR system 120. For example, AR system 120 may include a GPS receiver to communicate with GPS 160. In some embodiments, AR system 120 may include a projector to project annotations corresponding with a location adjacent to or within a threshold distance from AR system 120. In some embodiments, AR system 120 can provide a user interface to display any annotations associated with a geolocation of the AR headset to appear as respective overlays positioned with respect to the location adjacent to the AR headset. In some examples, the user interface may be incorporated with a lens of AR system 120. AR system 120 may also include one or more TI OMAP4 (open multimedia applications processors) and a flex cable with RF antenna.

Global Positioning System (GPS) 160 may include one or more processors, memory, as well as sensors to determine and transmit geolocation information of corresponding devices. For example, the geolocation information may be transmitted between the GPS satellite(s) and GPS receivers incorporated with AR headsets of AR system 120. In some examples, GPS 160 may determine and transmit the geolocation of AR headset directly to computing system 102 via network 150. In other examples, AR system 120 may receive the geolocation from GPS 160 via network 150 and transmit the received geolocation to computing system 102 via network 150 directly from AR system 120 and without an additional communication from GPS 160. Other geolocation be identified as well, including geolocation of objects (e.g., buildings, people via user devices, hazards, etc.).

Computing system 102 may include one or more processors and memory, illustrated as process engine 104. The processor(s) may be configured to perform various operations by interpreting machine-readable instructions stored in the memory. In some embodiments, data store 130 may include various databases, geolocation-based annotation data, application functionalities, application/data packages, and/or other data that are available for download, installation, and/or execution. Computing system 102 may also include location engine 106, annotation engine 108, feedback engine 110, route engine 112, and/or other engines. While computing system 102 is shown in FIG. 1 as a single entity, this is merely for ease of reference and is not meant to be limiting. One or more components/functionalities of computing system 102 described herein may be implemented, in whole or in part, within a single computing device or within multiple computing devices.

Location engine 106 is configured to determine a geolocation of devices (e.g., AR system 120, user device, etc.). Determining a geolocation may include conventional approaches such as transmitting one or more electronic communications between the device and GPS 160 to identify the movable location of the device. A static location of the device may also be identified by receiving or determining the coordinates of the device. The location (static or dynamic) may be stored with data store 130.

Location engine 106 may be configured to determine a distance between two devices or the distance between an object (e.g., building, person, hazard, etc.) and a device (e.g., AR system 120, user device, etc.).

Location engine 106 may be configured to determine terrain information associated with a location, including marked or unmarked terrain. For example, the terrain information may define elevations of a terrain within the location. The terrain information may identify restricted regions within the location based on changes in the elevations (e.g., slopes) of the terrain within the location that exceed a threshold. In some examples, the restricted regions may correspond with static locations identified by users as restricted regions, including hazards or other areas to avoid. The determination and analysis of the terrain may be used to identify a route corresponding with the marked or unmarked terrain for AR system 120. The route determination may include automatic analysis of terrains within the location, such as analysis of different slopes within the location. The slopes within the location may be used to determine the route paths that may be traversed by a user operating an AR headset of AR system 120 within the location. Additional details for determining the terrain and corresponding route are found with U.S. patent application Ser. No. 16/544,429, which is herein incorporated by reference in its entirety for all purposes.

Location engine 106 may be configured to identify an object using an image comparison algorithm or machine learning and determine its location. For example, location engine 106 may obtain an image of a location from AR system 120 using a camera incorporated with AR system 120, by capturing an image from a surrounding area where AR system 120 is located. The image may be transmitted from AR system 120 to location engine 106 (e.g., at computing system 102) via network 150. The image of the new object may be compared with other images of known objects to determine similarities. The new object may be matched to a known object and any relevant information of the known object may be correlated and stored with the image of the new object. When machine learning is used, location engine 106 may implement a supervised machine learning method to provide the image of the new object as input to a trained ML model, with output as a specified type of known object (e.g., persons, animals, plants, vegetations, vehicles, roads, structures, buildings, roads, marked or unmarked terrain, hazards, etc.). The ML model object identification may each correspond with confidence score to identify a relative likelihood that a particular object is identified by the ML model. In some examples, the image obtained from AR system 120 may correspond with additional metadata that describes a geolocation of AR system 120 (or an AR headset associated with AR system 120), originating device that captured the image, or other relevant information. The location at the time of image capture may have included one or more objects, such as persons, animals, plants, vegetations, vehicles, roads, structures, buildings, roads, marked or unmarked terrain, hazards, and/or other objects within the field of view of the image capture device, and such objects may be depicted within the image. The location of each of the identified objects in the image (e.g., via object comparison or via the ML model) may each correspond with the location of the image (e.g., identified via metadata).

The location engine 106 may provide the image as input to a trained machine learning model to identify the object in the image. For example, location engine 106 (with annotation engine 108) may identify (or classify) the object in the image based on comparisons between a set of known objects and their corresponding annotations. For example, location engine 106 may identify a hazard by providing the image (e.g., a mound of dirt, an unknown metal disc, a box with markings, etc.) as input to a trained, supervised ML model with output as a specified type of hazard (e.g., road hazard, road debris, etc.) and corresponding confidence score. The greater the confidence score for the particular type of hazard may correspond with a higher likelihood of the particular hazard being identified. This may help identify new hazards surrounding the location of AR system 120. Upon determining a likelihood of a new hazard, location engine 106 may identify the new hazard in the image, determine the corresponding geolocation of the hazard, and generate a new annotation for the new hazard (e.g., via annotation engine 108), each of which may be stored with data store 130. Location engine 106 may be configured to correlate any identified objects from output of the trained ML model with the location corresponding to the image used as input to the trained ML model. For example, the location of the object in the image may be identified as "Road Hazard Number Ten," and the location of "Road Hazard Number Ten" may be stored in data store 130 to correlate the identification of the object with the location corresponding to the object.

As another example, the objects may be identified within an image using data that is created independent of the image. For instance, a database may include position information (e.g., geographic coordinates) of buildings in a particular location (e.g., country, state, city, city block, zip code). Location engine 106 may determine the correspondence between pixels of the image and locations in the real world. For example, the data store may include geographic coordinates of schools in a city, and the geographic coordinates of the school may be used to determine the location and corresponding annotation to identify the object.

In some examples, location engine 106 may implement georectification of the image. For example, location engine 106 may reference the image of the particular location to a spatial grid. In some examples, the correlation of the image to the spatial grid may be used as a data layer with other maps, or so that the image can be used for associating points of interest with the spatial grid.

Annotation engine 108 may determine one or more annotations corresponding with objects in the image. The annotation can include a label or identifying information of the object (e.g., "Building A," "male human," "dog," etc.), metadata of the object (e.g., added by User A, etc.), suggested route path, or other digital feature that can label the object to provide additional information about the object. The annotations may be projected by AR system 120 to a lens incorporated with AR system 120 (e.g., AR headset or eyepiece, etc.) to appear as an overlay to particular geolocation surrounding AR system 120. In some embodiments, a set of AR headsets associated with AR system 120 may receive similar annotations so that multiple AR headsets may view the annotations concurrently and from different location perspectives.

Annotations may be created through a variety of methods. In some examples, the annotations corresponding with physical objects in the image may be identified by a machine learning (ML) model incorporated with annotation engine 108. For example, an object in the image may be compared to a set of known objects and their corresponding annotations. When a confidence score corresponding with the correlation between the object in the image and the known object exceeds a threshold, annotation engine 108 may generate an annotation for the object based on the confidence score and corresponding with the known object. Annotation engine 108 may store the annotation for the new object in the image at data store 130.

Annotations may be generated in response to feedback from a user (e.g., received via feedback engine 110). Feedback may be received in real-time by a user (e.g., based on an observation of the annotation at the location) or after a marking (or indication) by a different user than the user that observed the object at the location. The annotation may be received from a different user via a user interface of a user device.

Feedback may be received in real-time (e.g., based on an observation of the annotation at the location). For example, the user, while observing the object and/or in real time, may mark identify a physical object at the location using a tool provided by the AR headset (e.g., a menu option selection, voice navigation, etc.). AR system 120 may determine the coordinates of the identified object and transmit the coordinates with the image of the location that the user is observing from AR system 120 to annotation engine 108 (e.g., at computing system 102) via network 150.

Feedback may be received after marking a user interface by a different user (e.g., based on interacting with a user interface of a device at a remote location from the location). For example, a different user than the user associated with AR system 120 may provide feedback via a user interface at a remote location from the physical object. To generate an annotation from the feedback, the image may be presented to the different user within a user interface, and the user interface may provide one or more tools by which the different user may mark objects within the image. The system may correlate the feedback as annotations, such that the location of the marking is used to generate metadata defining boundaries of the object and location (e.g., coordinate location or pixel location) that corresponds with the annotation generated by the different user. The different user may interact with the user interface by moving a cursor to a portion of an image of the location and clicking on the portion to mark one or more objects at the portion. In another instance, the user interface may be presented on a touch interface (e.g., touchscreen) and the user may mark one or more objects at the portion of the image by engaging with the touch interface.

Annotation engine 108 may incorporate the feedback provided by the user at the location or the different user at a remote location to generate one or more annotations. Each annotation may correspond with one or more coordinates of the location to identify the object corresponding with the annotation. The annotation and corresponding location may be stored with data store 130 and provided back to the user for projection by AR system 120. The annotations may be provided at locations corresponding with the location of the object and updated in real time with respect to the received feedback. As a result, annotations made by the different user at the remote location are made accessible to the user present at the location of the physical object. In some examples, the updated annotations may be transmitted to a limited number of devices, including devices within AR system 120 that are within a threshold distance of the object corresponding with the updated annotation. The updated annotations may be projected by AR system 120.

Annotation engine 108 may also be configured to provide annotations corresponding with an object to train an ML model for identifying other objects within other images. That is, the labeling performed by annotation engine 108 may be used as an input to train the ML model (classifier), which may then be used to identify other objects. For example, the object may include a building and the labeling of the building within the image may be used to train the ML model for identifying depictions of buildings within images. In some embodiments, training of the ML model may be updated based on passage of time. That is, if annotations for a particular location has not been refreshed in a certain amount of time, new data may be required/requested to generate updated annotations for the location.

In some embodiments, the ML model may be used to detect changes in objects at a location over time. For example, the ML model may be trained to identify depictions of structures within images and the ML model may be used to determine how structures at a location have changed over time. For instance, the ML model may compare images of a location before a storm and after the storm to determine how structures at the location may have been impacted by the storm.

In some embodiments, outputs of the ML model may be used to recommend/identify particular types of information. For example, the ML model may be trained to identify depictions of structures within images. The ML model may output poor/inaccurate probabilities based on images of a particular location being of poor quality (e.g., low resolution, blurring). Such images/location may be tagged so that additional images of the location may be obtained for processing through the ML model.

In some embodiments, the ML model may consider timing. For example, images and annotations used to train the ML model may be associated with a particular time (e.g., time of image capture, season of image capture) and the time of images that are classified by the ML model may be used as an input into the ML model. Such use of timing may allow the ML model to compensate for different image characteristics that arise due to timing differences. For instance, identifying annotations of buildings in a daytime image may be different than identifying annotations of buildings in a nighttime image, or identifying annotations of buildings in a winter image (e.g., with buildings covered by snow) may be different than identifying annotations of buildings in a summer image (e.g., with buildings not covered by snow). The timing of the image may be used by the ML model to account for such changes/expected changes in images due to different conditions at different times. Geolocations associated with images may further be used to improve classification. For example, the environment condition of a location in one part of the world may be different than the environment condition of another location at a particular time, and the ML model may take into account location depicted within the image to identify the object at the location (e.g., via location module 106).

Feedback engine 110 is configured to receive feedback or confirmation of one or more objects represented within an image based on real-world observations made by a user of AR system 120. For example, an object within the image may correspond with a physical object at the location. The user associated with AR system 120 may be present at or near the location (e.g., within a threshold distance of the location or object). The user may provide feedback in association with object, including confirming that the object is present at the location, a state of the object, or any other attributes of the object (e.g., based on observing the object, etc.).

Feedback engine 110 may be configured to train the ML model using the feedback from users to improve its classifications and/or results. For example, the ML model may change the sensitivity of object detection based on user feedback. For instance, the ML model may output probabilities of different portions of an image including a depiction of an object, such as between zero (not a building) and one (a building). The image may be presented with one or more visual markers that indicate the probabilities, such as greyscale that indicates the probabilities. The visual makers may be changed based on a threshold to provide a more "concrete" result. For instance, a threshold may be set to a default value (e.g., 0.7) at which the probability is accepted as "true" and all portions of the image with the probability that satisfies the threshold may be marked as including the depiction of the object. The users may be presented with one or more options to change the value of the threshold, and how much the users change the value of the threshold may indicate that the extent to which the default value is incorrect. The feedback from the users (e.g., changes in the value of the threshold) may be used to change the default value of the threshold. Other improvements to the ML model based on other user feedback are contemplated.

In some embodiments, the ML model may utilize feedback from multiple users, including updates associated with the annotations of objects at a location. For example, the ML model may merge annotations of objects within images from different users to take advantage of annotations that has already been performed (e.g., using image comparisons or ML model object identification, both described herein, etc.). As another example, different users may be scored based on the accuracy of annotations provided by the different users, and the ML model may be trained using different weights for different annotations associated with different users.

Route engine 112 is configured to determine one or more sets of paths within the location based on restricted regions and/or other information. That is, based on the restricted regions obtained by location engine 106, route engine 112 may determine a route path for one or more entities to traverse. The route path may refer to a way or a route by which an entity may move (or travel) within the location. The route path may include one or more straight portions and/or one or more non-straight portions. Route engine 112 may determine the route path so that a path does not collide with a restricted region. For example, a route path may be determined by route engine 112 so that the path does not touch, run into, and/or run across any of the restricted region(s) within the location.

Route engine 112 may also be configured to determine the route path based on a skeleton analysis of the restricted regions within the location. A skeleton analysis may determine a topological skeleton of the location, and the set of route paths may follow one or more portions of the topological skeleton of the location. A topological skeleton of a shape may refer to a shape/line(s)/segment(s) that is equidistant to the boundaries of the shape. For example, for a location, the boundaries of the restricted regions may be treated as polygon that are subtracted from a shape of the location. That is, the restricted regions may be treated as holes within the shape of the location. The topological skeleton of the location may then be determined as those portions within the shape of the location which are equidistant from the edges of the holes.

The determination of the route path may be provided to annotation engine 108 for transmission to AR system 120. The route path may correspond with an annotation of the physical location of the AR system and appear as an overlay of the physical location at the user interface of the AR headset of AR system 120. In some examples, the user interface generated by annotation engine 108 may include an application program interface (APIs) and/or a graphical user interface. For example, annotation engine 108 may provide (e.g., make available for use, supply) one or more APIs that may be used by users/computing systems to access information describing the route path within the location. As another example, annotation engine 108 may provide (e.g., generate, present) one or more user interfaces (e.g., web user interface accessible through a browser) through which users may view the information describing the set(s) of paths within the location.

Figure 2:
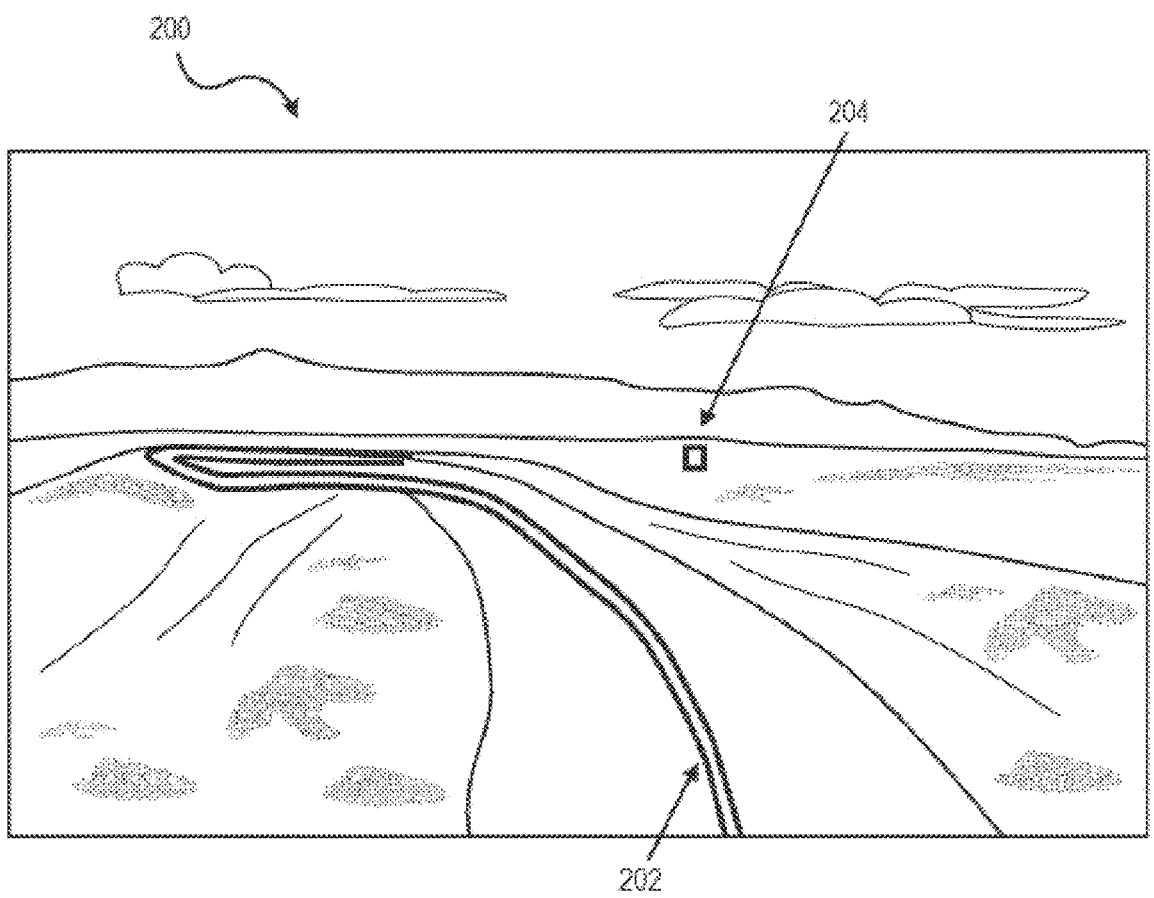
FIG. 2 illustrates an annotation to a route path corresponding with the geolocation of the AR system, in accordance with various embodiments.

FIG. 2 illustrates an annotation to a route path corresponding with a geolocation of an AR system, in accordance with various embodiments. For example, AR system 120 may correspond with location 200 and the determined route path may be provided to AR system 120 by computing system 102 (via annotation engine 108 and route engine 112). AR system 120 may display the route path as annotation 202 of location visible by AR headset of AR system 120. Other annotations may be provided as well, including second annotation 204 corresponding with a person, building, hazard, or other object of the location identified by computing system 102.

In some embodiments, a set of annotations may be provided to AR system 120 for projection at a plurality of AR headsets of AR system 120. A first AR headset may observe location 200 similar to what is provided with FIG. 2, including mountains and unmarked terrain associated with the location, as well as annotations 202, 204 that correspond with the geolocations surrounding AR system 120. A second AR headset may also observe location 200, but from a different perspective and with similar annotations 202, 204 that are determined in accordance with the perspective of second AR headset. Feedback may be provided by first AR headset or second AR headset to computing system 102 based on observation of the annotation. This feedback may include whether the road in the unmarked terrain is traversable, whether the object corresponding with second annotation 204 is actually present at the location, or any other feedback provided by the users via AR system 120. Computing device 102 may receive the feedback, update one or more annotations, and transmit the updated annotations to each of the AR headsets corresponding with AR system 120, so that these AR headsets may similarly project the updated annotations based on the feedback.

Figure 3:
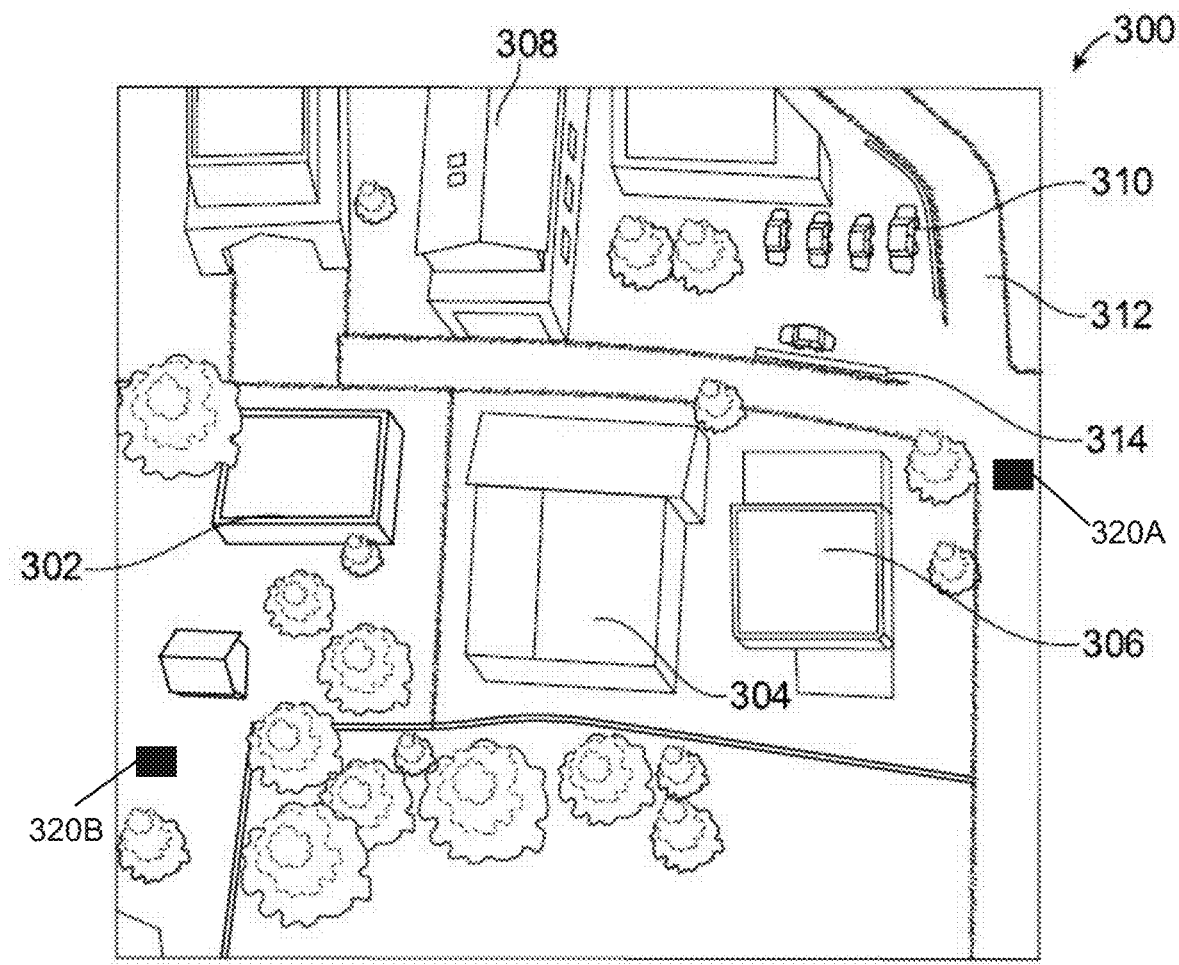
FIG. 3 illustrates an example image including depictions of objects corresponding with the geolocation of the AR system, in accordance with various embodiments.

FIG. 3 illustrates an example image 300 including depictions of objects 302, 304, 306, 308, 310, 312 in association with AR systems 320A, 320B, in accordance with various embodiments. Image 300 may include objects associated with a geolocation, including buildings 302, 304, 306, 308, car 310, curved road 312, and barrier 314. Each of the objects may correspond with an annotation that may be determined by a user or classifier (e.g., machine learning model) and/or confirmed by a user of AR systems 320A, 320B upon viewing the objects from different perspectives and potentially interacting with the objects. Feedback may be provided by one or more users of AR systems 320A, 320B to generate updated annotations. The classifier may have been trained using labeling of images performed based on marking of dots within the images or annotations of geolocations received from AR system 120, data store 130, or a third-party device. For example, a classifier trained to identify depictions of buildings within images may be used to identify and determine annotations for buildings 302, 304, 306, 308 at geolocation 300.

Figure 4:
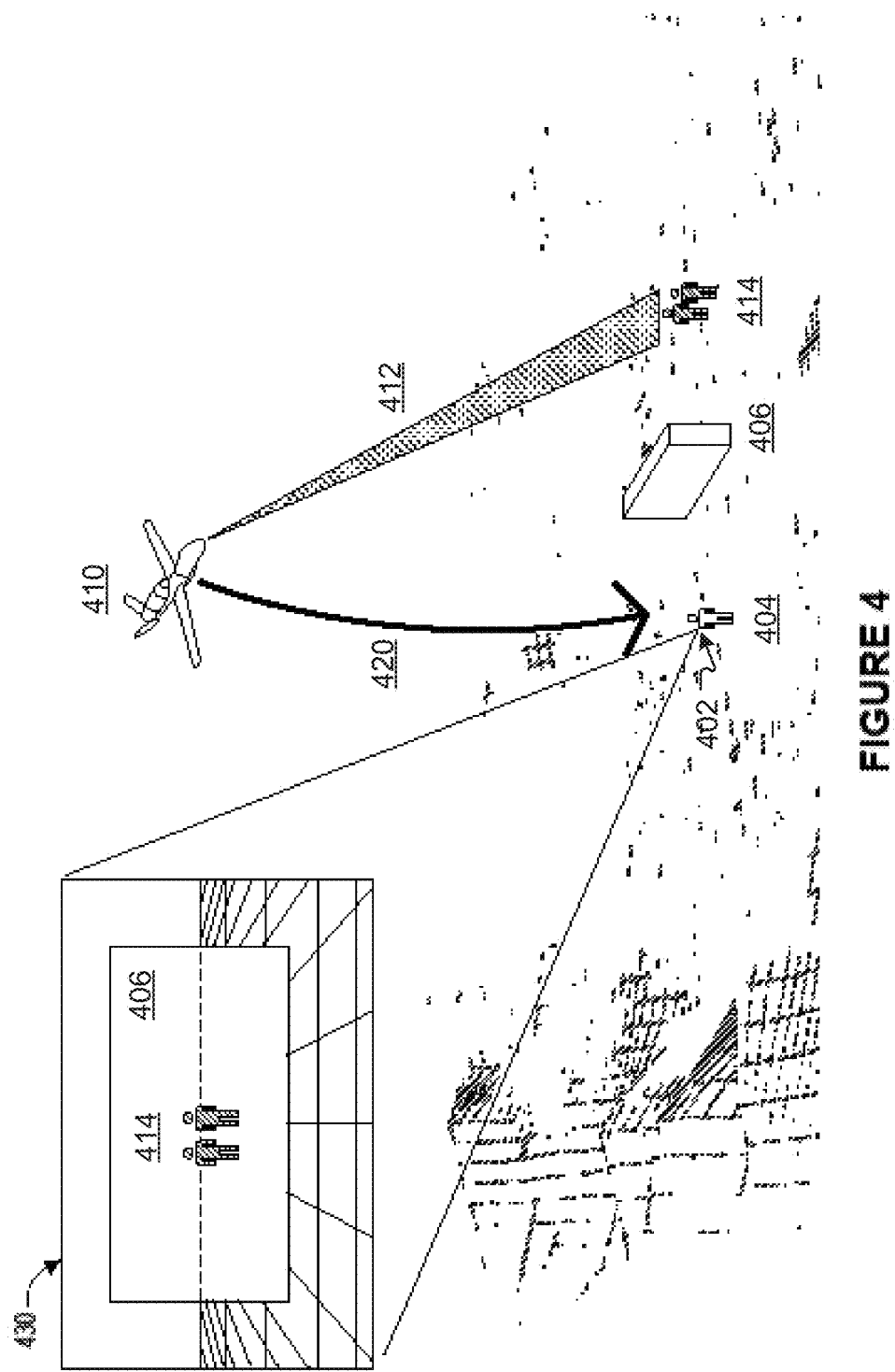
FIG. 4 illustrates example sources of annotations, in accordance with various embodiments.

FIG. 4 illustrates example sources of annotations. In the example of FIG. 4, a user of AR headset 402 is present at a location 404. The AR headset 402 can be implemented as AR system 120, as described in reference to FIG. 1. For example, from the location 404, the AR headset 402 can capture and process data based on one or more sensors associated with the AR headset 402. For example, the AR headset 402 can identify and annotate wall 406. Objects behind the wall 406 may be blocked or restricted from being observed by the AR headset 402 at location 404. To improve visibility, the AR headset 402 can be configured to operate with devices (e.g., AR headset, unmanned aerial vehicle (UAV), etc.) in other locations.

For example, FIG. 4 illustrates a UAV 410. The UAV 410 can implement on-board sensors and processing capabilities similar to AR system 120. For example, the UAV 410 can implement a camera for recording content (e.g., images and/or video). In an example, content captured by the UAV 410 can be communicated to the AR headset 402 at location 404. For example, the content can be transmitted directly from the UAV 410 to the AR headset 402 or via an AR system (e.g., the computing system 102 of FIG. 1). In this example, the AR headset 402 can generate annotations based on the content received from the UAV 410. Alternatively, the UAV 410 can also be configured to annotate content captured by one or more on-board sensors. For example, the UAV 410 can implement an annotation engine (e.g., the annotation engine 108 of FIG. 1) that allows the UAV 410 to capture and annotate content. In this example, the UAV 410 can transmit to the AR headset 402 data describing annotations that were generated by the UAV 410.

In the example of FIG. 4, the UAV 410 is shown capturing content associated with an area 412. Area 412 may include people 414 that are located behind the wall 406. Thus, the people 414 are visible to the UAV 410 but not to the AR headset 402 positioned at location 404. In this example, the UAV 410 can determine annotations associated with the area 412, such as an annotation identifying the people 414. The annotations may be transmitted 420 to the AR headset 402. The AR headset 402 may receive the annotation identifying the people 414. The AR headset 402 can display the annotations at their respective locations within a display screen associated with the AR headset 402. For example, the AR headset 402 can display image data 430 when the AR headset 402 is facing the wall 406. The image data 430 can also provide an annotation identifying the people 414 behind the wall 406. As a result, the user of the AR headset 402 can visualize the people 414 behind the wall 406, which would not be possible if relying solely on annotations generated based on content captured and processed by the AR headset 402.

Figure 5:
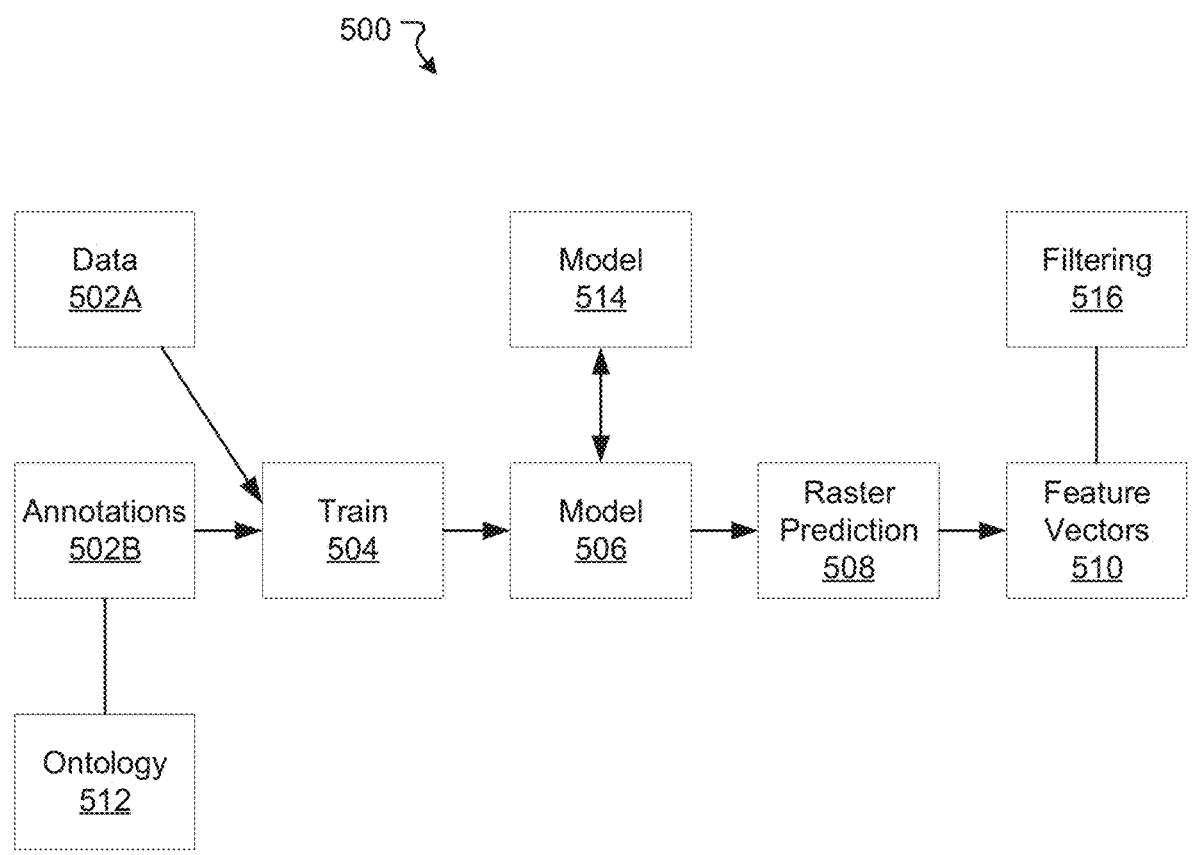
FIG. 5 illustrates an example overview for training and using a machine-learning model for determining or confirming annotations with the geolocation of the AR system, in accordance with various embodiments.

FIG. 5 illustrates an example overview for training and using a machine-learning model 500, in accordance with various embodiments. In the overview 500, one or more inputs may be used to train 504 a model 506. For example, the inputs to train 504 the model 506 may include data 502A and annotations 502B.

The data 502A may include information stored in one or more databases, including video, audio, images, geolocation information, feedback from the AR system, metadata, or other information. One or more transformation operations may be performed on the data 502A to prepare the data for model training. For example, the data 502A may include a combination of image and geolocation data, and the data 502A be prepared for training of the model 506 using normalization and/or merging operations.

The annotations 502B may include labeling of images/objects depicted within images. The annotations 502B may provide for transformation of information in a geo-spatial space to a pixel space. For instance, the annotations 502B may transform geolocations of objects (e.g., buildings) into labeling of corresponding pixels within images and/or confirm existing annotations or labels. The annotations 502B may use an ontology 512 that defines a structure for object labeling. For example, the ontology 512 may define different types of objects (e.g., buildings, people/persons, routes, vehicles, hazards, etc.) and/or different categories of a type of object (e.g., buildings with different shapes, buildings with different purposes, commercial vs residential vs government buildings). Such organization of annotations may provide for use of curated annotations in training the model 506.

In some embodiments, the model 506 may work and/or interact with another model 514, which has been trained on different data and/or different user input. For example, the outputs of the model 514 may be used to verify the outputs of the model 506 and/or vice versa. The interactions of the models 506, 514 may provide for retraining of one of both of the models 506, 514. One of both of the models 506, 514 may be retrained based on additional information. For example, the model 506 may be retrained based on additional classifications of data. For instance, data from additional sensor(s) may be provided as input to train 504 the model 506.

The model 506 may provide a raster prediction 508 based on its training, which may result in outputting of feature vectors 510. The feature vectors 510 may provide for transformation of information in the pixel space to the geo-spatial space. That is, predictions made by the model 506 may be transformed into information on geolocations of objects based on identification of where the objects are depicted within images. The feature vectors 510 may be processed using filtering 516, which may remove one or more results based on one or more criteria. For example, certain portions of the feature vectors 510 indicating the depiction of a certain object (e.g., building) within an image may be filtered out based on the corresponding portions of the images having sizes and/or shapes that do not correspond to the size and/or shape of a building.

Figure 6:
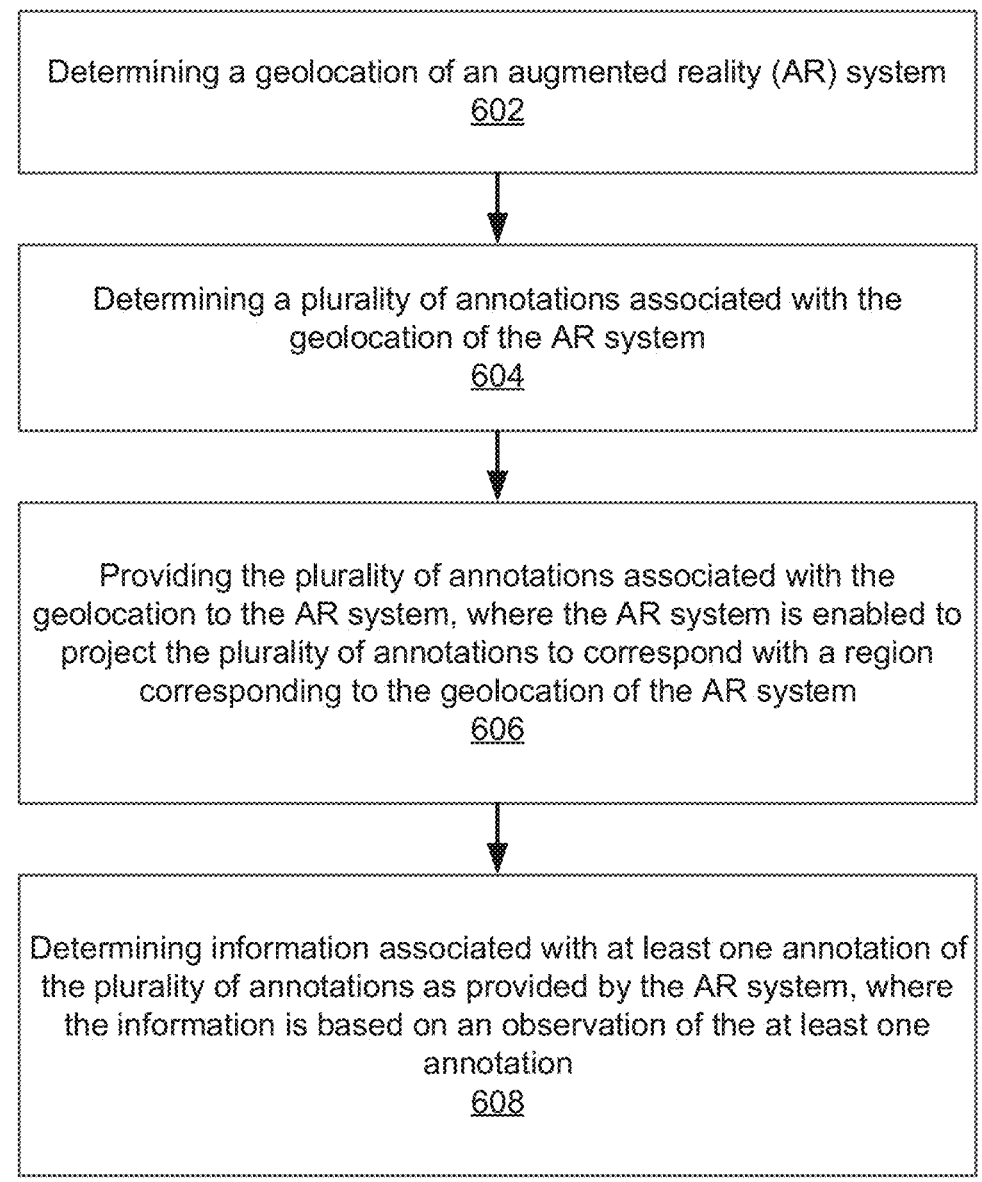
FIG. 6 illustrates a flowchart of an example method, in accordance with various embodiments.

FIG. 6 illustrates a flowchart of an example method 600, according to various embodiments of the present disclosure. The method 600 may be implemented in various environments including, for example, the environment 100 of FIG. 1. The operations of method 600 presented below are intended to be illustrative. Depending on the implementation, the example method 600 may include additional, fewer, or alternative steps performed in various orders or in parallel. The example method 600 may be implemented in various computing systems or devices including one or more processors.

At block 602, a geolocation of an augmented reality (AR) system may be determined. At block 604, a plurality of annotations associated with the geolocation may be determined. At block 606, the plurality of annotations associated with the geolocation may be provided. For example, the AR system may be enabled to project the plurality of annotations to correspond with a region corresponding with the geolocation. At block 608, information associated with an annotation of the plurality of annotations may be determined. For example, the information may be based on an observation of the annotation.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
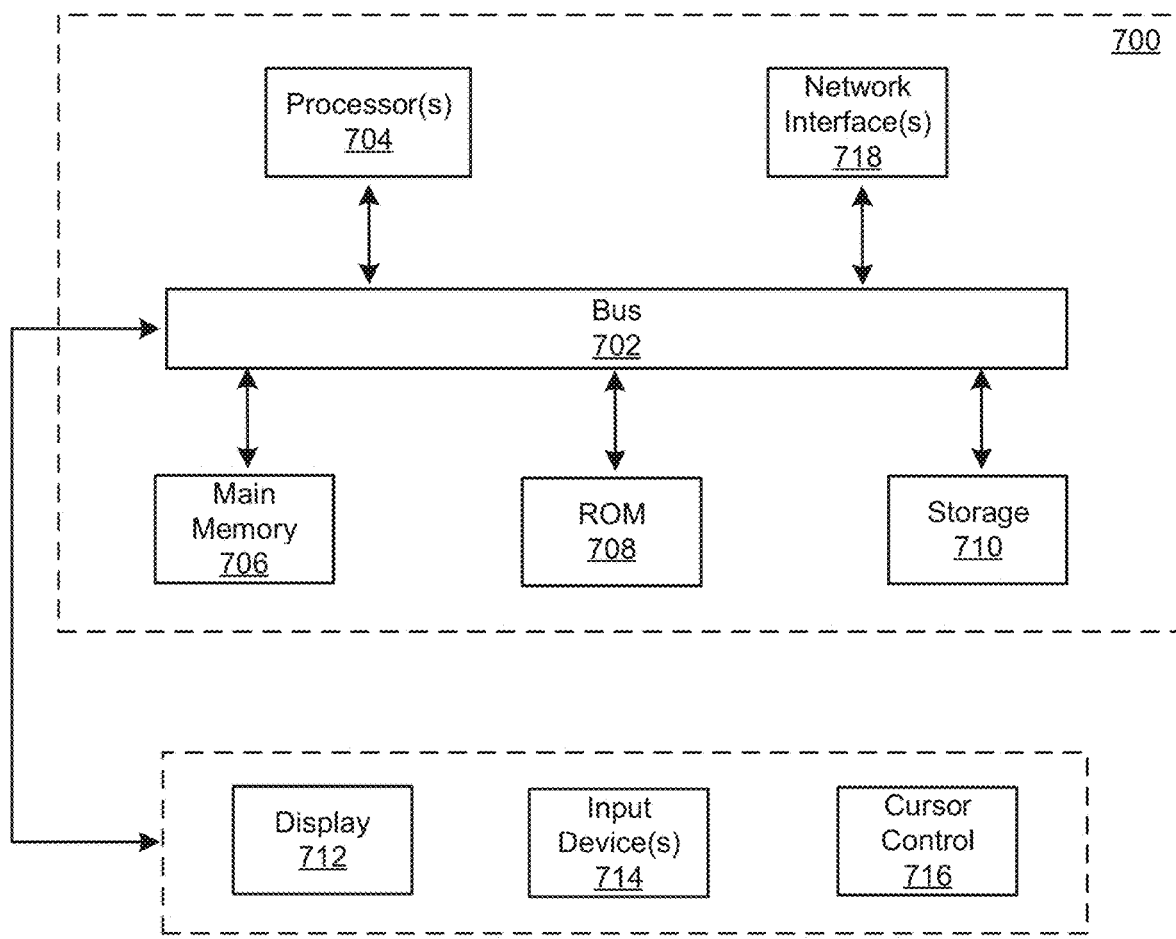
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method comprising:
   determining, by a computing system, a geolocation of an augmented reality (AR) system;
   determining, based on a size and a type of an entity, whether any portions of a previously unlabeled path are traversable or non-traversable by the entity;
   receiving an indication of a change in the size or the type of the entity;
   updating the determination of whether the any portions of the previously unlabeled path are traversable or non-traversable by the entity;
   determining, by the computing system, a plurality of annotations associated with the geolocation of the AR system, wherein an annotation of the annotations indicates any traversable or non-traversable portion of the previously unlabeled path, according to the updated determination;
   providing, by the computing system, the plurality of annotations associated with the geolocation to the AR system, wherein the AR system is enabled to project the plurality of annotations to correspond with a region corresponding to the geolocation of the AR system;

determining, by the computing system, information associated with at least one annotation of the plurality of annotations as provided by the AR system, wherein the information is based on an observation of the at least one annotation; and outputting, as an overlay with respect to the geolocation, an indication of the any traversable or non-traversable portion of the previously unlabeled path.

2. The method of claim 1, wherein the annotation of the plurality of annotations is created by a user of a different AR system while at the geolocation of the AR system.

3. The method of claim 1, wherein the annotation of the plurality of annotations is updated by a user of a different AR system while at the geolocation of the AR system.

4. The method of claim 1, wherein the annotations identify one or more hazards present within a region corresponding with the geolocation of the AR system.

5. The method of claim 1, wherein the observation is determined based on information provided by a user of the AR system.

6. The method of claim 1, wherein the observation is determined based at least in part on sensor data collected by one or more sensors associated with the AR system.

7. The method of claim 1, further comprising:
updating, by the computing system, information associated with the annotation based on the information provided by the AR system.

8. The method of claim 1, wherein the annotations are selected from a list comprising at least a route path, a person, a building, and a hazard.

9. The method of claim 1, wherein the annotations comprise a visualization of temporal and non-temporal costs for an entity to traverse one or more paths.

10. The method of claim 1, wherein the outputting of the indication is in response to a confirmation; and the determining of the traversable route path is based on a degree of slip of terrain corresponding to the previously unlabeled path.

11. A computing system comprising:
one or more processors;
a memory storing instructions that, when executed by the one or more processors, cause the computing system to perform:
 determine a geolocation of an augmented reality (AR) system;
 determine, based on a size and a type of an entity, whether any portions of a previously unlabeled path are traversable or non-traversable by the entity;
 receive an indication of a change in the size or the type of the entity;
 update the determination of whether the any portions of the previously unlabeled path are traversable or non-traversable by the entity according to the change in the size or the type of the entity;
 determine a plurality of annotations associated with the geolocation of the AR system, wherein an annotation of the annotations indicates any traversable or non-traversable portion of the previously unlabeled path, according to the updated determination;
 providing the plurality of annotations associated with the geolocation to the AR system, wherein the AR system is enabled to project the plurality of annotations to correspond with a region corresponding to the geolocation of the AR system;
 determine information associated with at least one annotation of the plurality of annotations as provided by the AR system, wherein the information is based on an observation of the at least one annotation; and
 output, as an overlay with respect to the geolocation, an indication of the any traversable portion of the previously unlabeled path.

12. The computing system of claim 11, wherein the annotation of the plurality of annotations is created by a user of a different AR system while at the geolocation of the AR system.

13. The computing system of claim 11, wherein the annotation of the plurality of annotations is updated by a user of a different AR system while at the geolocation of the AR system.

14. The computing system of claim 11, wherein the annotations identify one or more hazards present within a region corresponding with the geolocation of the AR system.

15. The computing system of claim 11, wherein the observation is determined based on information provided by a user of the AR system.

16. The computing system of claim 11, wherein the observation is determined based at least in part on sensor data collected by one or more sensors associated with the AR system.

17. The computing system of claim 11, wherein the computing system is further configured to:
update information associated with the annotation based on the information provided by the AR system.

18. A method comprising:
determining, by a computing system, a geolocation of an augmented reality (AR) system;
determining whether any portions of a previously unlabeled path are traversable or non-traversable by an entity, wherein a non-traversable portion comprises a restricted region and a buffer around the restricted region;
determining, by the computing system, a plurality of annotations associated with the geolocation of the AR system, wherein an annotation of the annotations indicates any traversable portion of the previously unlabeled path;
providing, by the computing system, the plurality of annotations associated with the geolocation to the AR system, wherein the AR system is enabled to project the plurality of annotations to correspond with a region corresponding to the geolocation of the AR system;
determining, by the computing system, information associated with at least one annotation of the plurality of annotations as provided by the AR system, wherein the information is based on an observation of the at least one annotation; and
outputting, as an overlay with respect to the geolocation, an indication of the any traversable portion of the previously unlabeled path.

* * * * *